United States Patent
Benz

[15] 3,674,998
[45] July 4, 1972

[54] METHOD AND APPARATUS FOR AUTOMATIC PHASE CONTROL IN A FOURIER ANALYZED READOUT OF IMPULSE RESONANCE DATA

[72] Inventor: Hanspeter Benz, Santa Clara County, Calif.

[73] Assignee: Varian Associates, Palo Alto, Calif.

[22] Filed: March 4, 1970

[21] Appl. No.: 16,497

[52] U.S. Cl.................................235/151.3, 324/.5, 324/77
[51] Int. Cl.........................................................G01r 33/08
[58] Field of Search.....................235/151.3; 324/.5 E, .5 A, 324/77 B, 77 L, 77 CS, 77 G, 77 H

[56] References Cited

UNITED STATES PATENTS 3,263,169  7/1966  Remley................................324/77 H

FOREIGN PATENTS OR APPLICATIONS 797,057  6/1958  Great Britain......................324/77 G

*Primary Examiner*—Malcolm A. Morrison
*Assistant Examiner*—Edward J. Wise
*Attorney*—Stanley Z. Cole and Vincent W. Cleary

[57] ABSTRACT

Method and apparatus for storing and reading out impulse resonance spectral data is disclosed. Impulse resonance spectral data containing a plurality of simultaneous Fourier components are added and time averaged in a computer or storage and adder. The stored resonance data is then Fourier analyzed to obtain a complex reference resonance line output containing a sum of both the real and imaginary parts of the time averaged resonance component. The resonance component is then analyzed for line symmetry to obtain an output representative of line symmetry. The line symmetry output is employed for changing the phase of both the real and imaginary components of the Fourier analyzed resonance component to reduce either the real or complex part of the resonance component to zero to obtain pure absorption or dispersion mode resonance spectra output.

14 Claims, 8 Drawing Figures

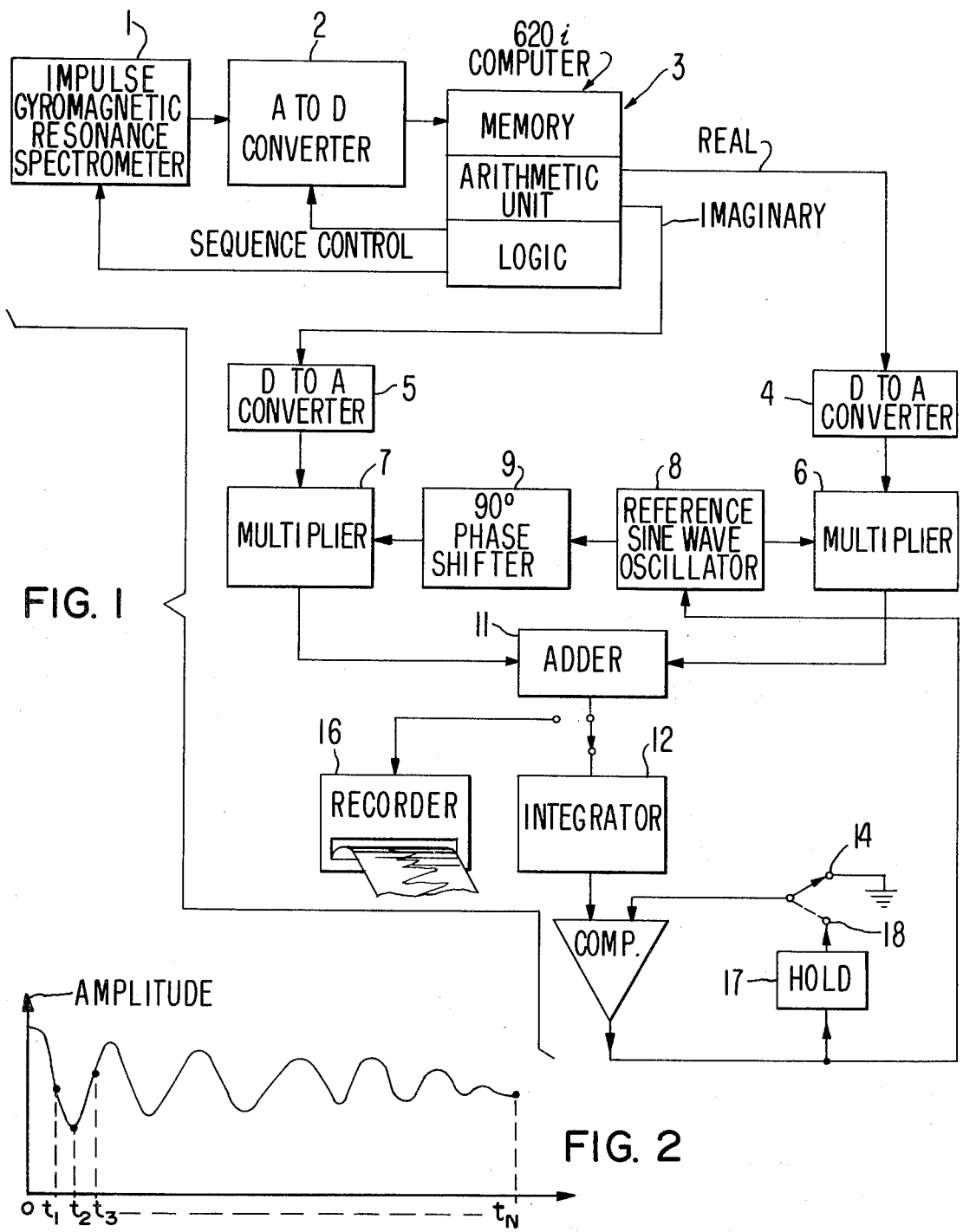
FIG. 1
FIG. 2
FIG. 3
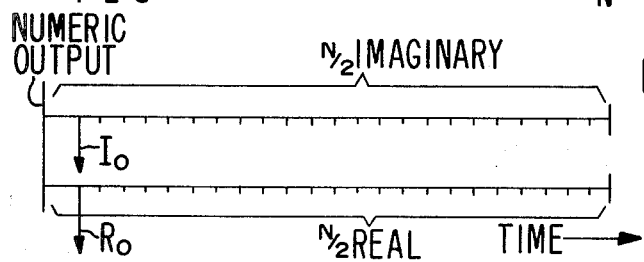
INVENTOR.
HANSPETER BENZ
ATTORNEY

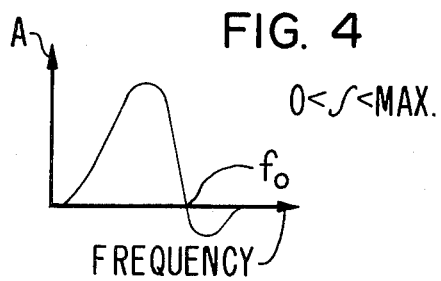
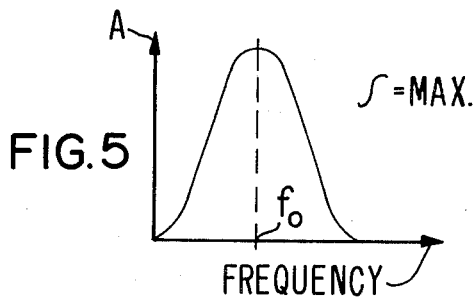
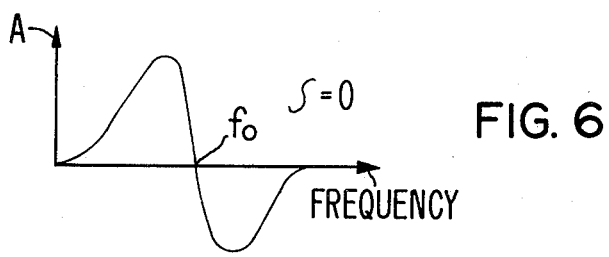
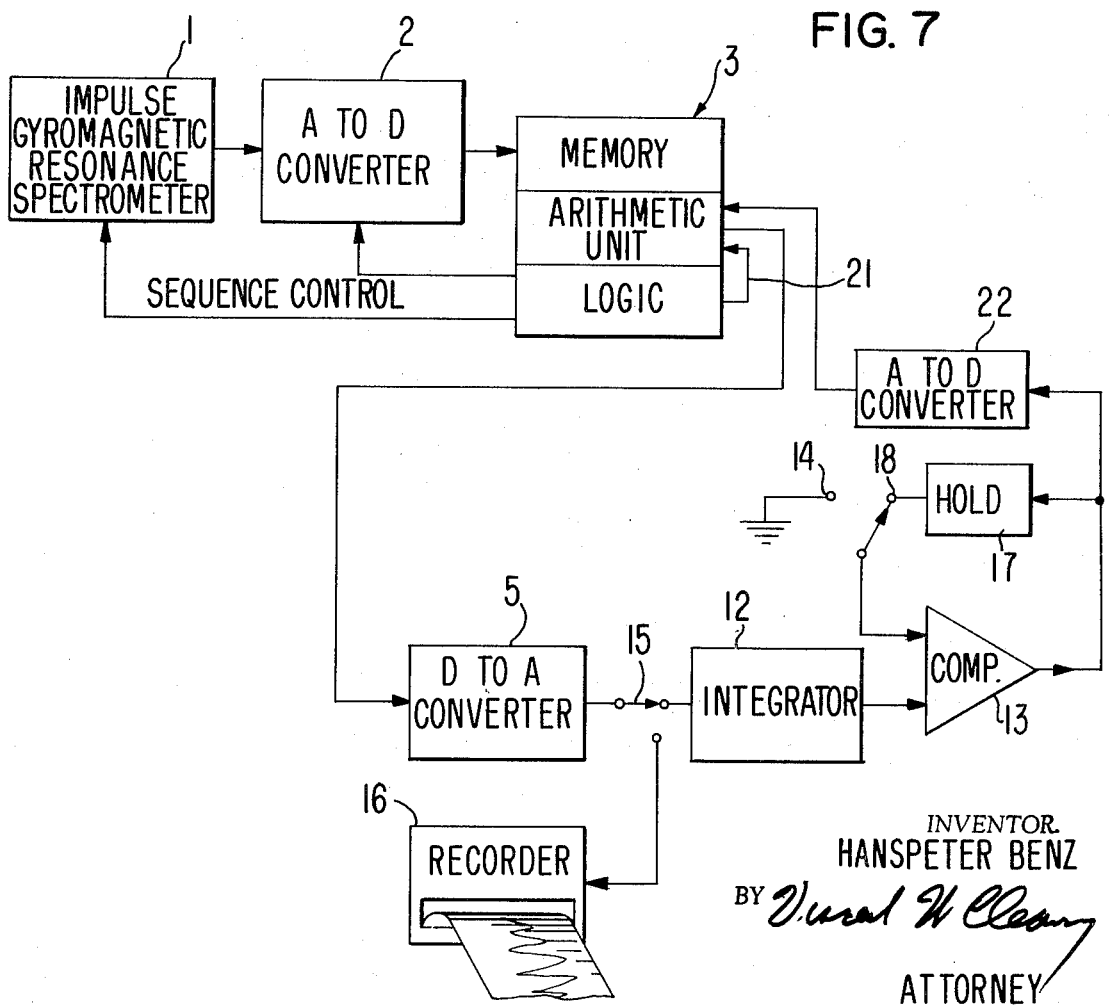

METHOD AND APPARATUS FOR AUTOMATIC PHASE CONTROL IN A FOURIER ANALYZED READOUT OF IMPULSE RESONANCE DATA

DESCRIPTION OF THE PRIOR ART

Heretofore, computer operated gyromagnetic resonance spectrometers have included means for repetitively scanning a reference resonance line to obtain a resonance output. The resonance output is analyzed for line symmetry to obtain an output which is either maximum or minimum depending upon whether the absorption or dispersion mode of the resonance line is being observed. The phase of the r.f. energy applied for exciting resonance of the line is then corrected in response to the symmetry analysis such that pure absorption or pure dispersion is observed. Such a spectrometer is described and claimed in copending U.S. application Ser. No. 661,985 filed Aug. 21, 1967 and assigned to the same assignee as the present invention.

In another prior art spectrometer, impulse gyromagnetic resonance spectral data is obtained from a gyromagnetic resonance spectrometer and fed to a storage and adder for time averaging. The time averaged resonance spectral data is then Fourier analyzed by sequentially reading out the information stored in the various channels of the storage and adder and heterodyning the output with a reference oscillator signal. The frequency of the reference oscillator is swept in accordance with a scanner signal to obtain the separate Fourier components of the resonance data. Pure absorption or pure dispersion mode output is obtained by adjusting the starting time of the readout sequencer relative to the phase of the variable frequency oscillator. However, in this prior spectrometer the phase control of the recorded output of the Fourier analyzer is not obtained automatically but depends upon the skill and judgment of the operator as he observes the recorded Fourier analyzed output. Such a spectrometer is disclosed and claimed in U.S. Pat. No. 3,461,381 issued Aug. 12, 1969 and assigned to the same assignee as the present invention.

One of the problems associated with trying to correct the phase of the resonance data obtained from the spectrometer by correcting the operating parameters of the spectrometer is that the resonance line quite often is not observable until after resonance data derived from many sweeps of the sample has been time-averaged because of the low signal-to-noise ratio. As a consequence, any system that corrects the phase of the spectrometer can involve an extremely tedious and time-consuming effort when weak signals are being observed. Correcting the phase of the readout of the Fourier analyzer of the time averaged spectral data has the advantage of permitting the phase to be more rapidly corrected. It is desired that a system be provided for automatically correcting the phase of the Fourier analyzed readout of the time averaged data to either the pure dispersion or absorption mode without having to rely upon the judgment of an operator.

SUMMARY OF THE PRESENT INVENTION

The principal object of the present invention is the provision of improved method and apparatus for automatically controlling the phase of a Fourier analyzed readout of time averaged impulse resonance spectral data.

One feature of the present invention is the provision, in a Fourier analyzed readout of impulse resonance spectral data, of analyzing a reference complex Fourier line output for symmetry of the resonance line shape to obtain an output representative of the line symettry and automatically changing the phase of the real and imaginary parts of the complex resonance line component by a like amount in accordance with the output of the symmetry analysis to obtain pure absorption or pure dispersion mode readout.

Another feature of the present invention is the same as the preceding feature wherein the resonance data is stored in a memory and Fourier analyzed components of the resonance spectra are read out of the memory and wherein the phase of the real and complex parts of the remaining Fourier components are charged according to the phase determined by the reference Fourier component to obtain pure absorption or dispersion mode resonance spectra.

Another feature of the present invention is the same as any one or more of the preceding features wherein the reference resonance line is analyzed for symmetry by integrating the line and changing the phase of the real and imaginary parts of the resonance line according to the integrated output to obtain either pure absorption or pure dispersion mode output.

Another feature of the present invention is the same as the first feature wherein the symmetry analysis of the reference line is obtained by measuring and comparing the peak amplitudes of the resonance line.

Another feature of the present invention is the same as any one or more of the preceding features wherein the phase of both the real and imaginary parts of the complex resonance components are changed by a like amount by multiplying the real and imaginary parts of the reference complex line component by different ones of a pair of sine wave values shifted 90° relative to each other, such sine wave values having their phase changed by equal amounts to change the phase of the real and imaginary parts of the complex resonance component.

Other features and advantages of the present invention will become more apparent upon perusal of the following specification taken in connection with the accompanying drawings wherein:

BRIEF DESCRIPTION OF THE DRAWINGS

FIG. 1 is a schematic line diagram, in block diagram form, depicting a gyromagnetic resonance spectrometer, time averager and Fourier analyzer incorporating features of the present invention.

FIG. 2 is a plot of resonance signal amplitude versus time depicting the sampling points of the composite resonance signal for storage in the memory.

FIG. 3 is a plot of numeric output versus time for both the imaginary and real numbers corresponding to the real and imaginary Fourier components of the resonance spectral data.

FIGS. 4–6 are plots of signal amplitude versus frequency depicting the resonance line shapes for mixed absorption and dispersion, pure absorption, and pure dispersion modes, respectively.

FIG. 7 is a schematic line diagram, in block diagram form, depicting an alternative impulse spectrometer, time averager, and Fourier analyzer incorporating features of the present invention.

DESCRIPTION OF THE PREFERRED EMBODIMENTS

Figure 8:
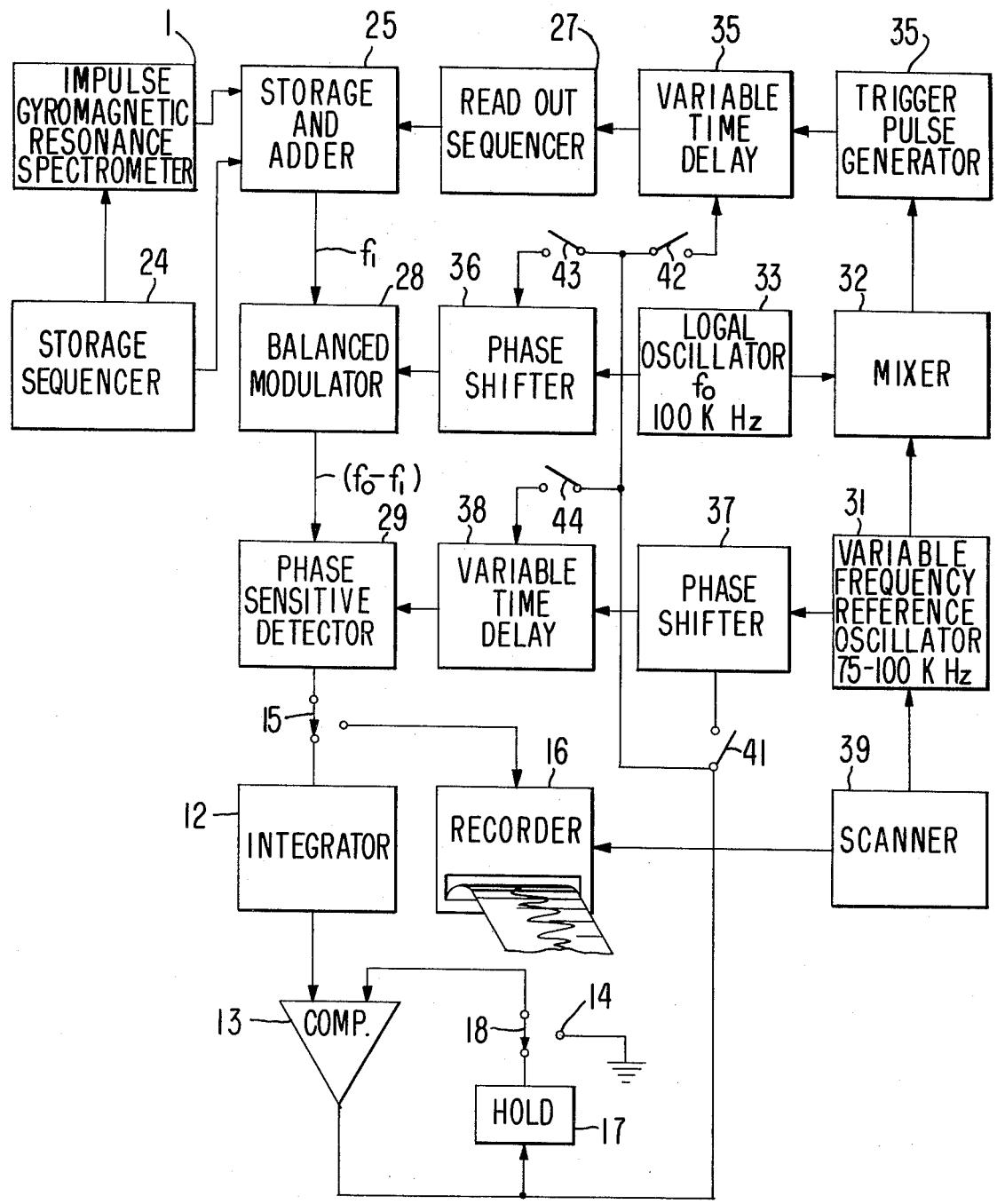
FIG. 8 is a schematic block diagram of an alternative gyromagnetic resonance spectrometer, time average, and Fourier analyzer incorporating features of the present invention.

Referring now to FIG. 1, there is shown, in block diagram form, an impulse gyromagnetic resonance spectrometer with computer control and Fourier analyzer for Fourier analyzing a time averaged spectrum. More specifically, an impulse gyromagnetic resonance spectrometer 1, generally of the type described in the aforecited U.S. Pat. No. 3,461,381, has its output fed to an analog-to-digital converter (ADC) 2. The output of the spectrometer 1 comprises a succession of transient signals of the type shown in FIG. 2 wherein the amplitude of the audio output signal fluctuates with time. The ADC 2, under the control of a computer 3, such as a Varian data machine 620 $i$ or PDP-8 computer from Digital Equipment Corporation, causes the ADC 2 to sample the output of the spectrometer 1 at a succession of times $t_1, t_2, t_3 \ldots t_N$ there being a sampling time for each channel of the memory of the computer 3. The sampled amplitude of the output signal is converted to a digital number which is accumulated in a respective channel of the memory of the computer 3 as disclosed in U.S. Pat. No. 3,475,680 issued Oct. 28, 1969. Each of the sampling points $t_1$, $t_2$, $t_3$, etc., occurs precisely at the same point in each of the succeeding output signals derived from the resonance spectrometer 1 due to a synchronizing control which synchronizes the sampling times with the start of each impulse resonance signal derived from the spectrometer 1.

Briefly, the gyromagnetic resonance spectrometer 1 includes a radio frequency transmitter which has a carrier frequency, as of $\phi$MHz, near the gyromagnetic resonance frequency of the gyromagnetic bodies in a polarizing magnetic field of the spectrometer. The transmitter is pulsed with very short impulses, as of 10 microseconds duration, such pulses having a period between pulses of approximately 1 second. In this manner a spectrum of transmitted energy is obtained within the sample, such spectrum having a multitude of closely spaced spectral lines, as of 1 Hertz separation, over a relatively wide band of on the order of 1,000 cycles for simultaneously exciting all the resonance lines in the sample under analysis. The simultaneous resonance lines contribute to the composite output resonance signal which is reduced by heterodyning to an audio frequency having a characteristic as shown in FIG. 2.

Thus, the successive transient output signals from the spectrometer are each sampled at a succession of time intervals $t_1$, $t_2$, $t_3$ . . . $t_N$ at the same place in each output signal on successive scans and the sampled amplitude of the resonant signal for each sampling point is converted to a digital number and added for successive scans to the digital number of the sum of the previous scans in the memory of the computer 3 to obtain a time average of the resonance signals. The accumulated numbers stored in each of the respective channels of the memory, as of 4,096 channels, are then readout in succession and Fourier analyzed to obtain the separate Fourier components of the time averaged resonance signal as disclosed in the aforecited U.S. Pat. No. 3,475,680. Computer programs for the Fourier analyzer are disclosed in articles titled; "A Fast Fourier Transformer Algorithm For Real-Valued Series" and "Algorithm For The Machine Calculations of Complex Fourier Series" appearing in Communications of the ACM, Volume 11, No. 10 October, 1968, pgs. 703–710, and Mathematical Computations, Volume 19 of April, 1965, pgs. 297-301. Such time averaged Fourier components being stored in the memory of the computer. The Fourier transformed output of the computer 3 comprises a real number and an imaginary number for each time averaged Fourier resonance line of the spectrum. In a case where there are N time-average storage channels in the memory of the computer 3 there will be N/2 real numbers R and N/2 imaginary numbers I as shown in FIG. 3. If the spectrometer 1 were operating in a pure absorption mode only real numbers R would be obtained for the output of the Fourier analysis. Conversely, if the spectrometer 1 were operating in the pure dispersion mode only the imaginary numbers I would be obtained in the output of the Fourier analysis. However, various phase shifts are obtained in the spectrometer 1 such as those encountered by a band limiting filter in the receiver, phase shifts produced by the radio frequency detector in the receiver, and phase shifts obtained due to pulsing of the gyromagnetic resonance bodies. Thus, from a practical point of view, the output resonance signal from the spectrometer 1 will not be pure absorption or pure dispersion but will be a combination thereof such that the output of a Fourier analysis of the time averaged stored resonance data will form a succession of complex numbers each complex number corresponding to a spectral Fourier line of the time averaged resonance signal and each complex number including a real number and an imaginary number part.

The readout real number of each pair of numbers is fed to a digital-to-analog converter (DAC) 4 and the readout imaginary number of each pair of numbers is fed to a second digital-to-analog converter (DAC) 5. The synchronizing analog outputs of the converters 4 and 5 are fed to one input, respectively, of a pair of multipliers 6 and 7 wherein they are multiplied with a reference sine wave value derived from a sine wave oscillator 8, such oscillator having a frequency of such that the period of the sine wave is many times greater than the time required for the readout of N/2 pairs of numbers stored in the memory as a result of the Fourier analyzer of the stored resonance signal data such that sine wave value does not change substantially during a readout sequence. In a typical example, the sine wave oscillator 8 has a frequency of 0.1 Hertz for a readout time of 100 milliseconds. One output of the sine wave oscillator 8 is fed to a 90° phase shifter 9 and the output of the 90° phase shifter is fed to multiplier 7 such that the reference sine wave signal as fed to the multipliers 6 and 7 is phase shifted 90° in one multiplier relative to the other. This corresponds mathematically to multiplying the real part of the Fourier component by a sine value of a certain angle and multiplying the imaginary part by a cosine value of the same angle or conversely multiplying the imaginary part by a sine value of a certain angle and multiplying the real part by a cosine value of the same angle.

The outputs of the multipliers 6 and 7 are fed to an adder 11 to obtain a complex Fourier resonance output. The output of the adder 11 is fed to a device for measuring symmetry of a reference line, such as an integrator 12. Other such means for measuring line symmetry include means for calculating the momentum of the line, means for measuring peak-to-peak amplitude of the line, etc. The output of the adder 11 corresponds to the time averaged Fourier resonance line outputs from the spectrometer and has line shapes of the type generally shown in FIGS. 4 through 6. FIG. 4 shows a complex resonance line having a mixture of both absorption and dispersion mode components. FIG. 5 shows a pure absorption mode resonance line and FIG. 6 shows a pure dispersion mode resonance line.

Integrator 12 will intergrate the area under the line above and below the base line. A line of the shape shown in FIG. 4 integrates to more than zero but less than a maximum value, the absorption line of FIG. 5 integrates to a maximum value, whereas the dispersion mode resonance line of FIG. 6 integrates to zero. As an alternative to integrating the area under the resonance line, symmetry can also be analyzed by measuring the peak amplitude both above and below the base line and subtracting the two. In such a case, the dispersion mode would have a maximum value and the complex resonance line of FIG. 4 would have an intermediate value as with the results of the integrator.

The output of the integrator 12 is fed to a comparator 13 which may have a reference input from ground for a base line level voltage, indicated at terminal 14, for detecting pure dispersion mode output. The error signal output of the comparator 13 is then fed to the reference sine wave oscillator 8 for controlling the phase of both the reference sine and cosine inputs to the multipliers 6 and 7 in accordance with the output of the comparator to obtain pure dispersion mode Fourier resonance components of the time averaged resonance data.

Once the reference sine wave oscillator 8 is set to the proper phase for obtaining pure dispersion mode resonance output, a switch 15 in circuit between the adder 11 and the integrator 12 is switched to a recorder 16 and the logic in the computer 3 causes the entire Fourier analyzed spectral data stored in the memory to be read out through the real and imaginary channels using the phase for the sine and cosine values derived from corrected sine wave oscillator 8 to obtain a complete Fourier transformed output spectrum which is pure dispersion and which is recorded by recorder 16.

Typically, it is desired to record the absorption mode rather than the dispersion mode output, thus, once the proper phase of the reference oscillator 8 has been determined to yield pure dispersion mode, pure absorption mode output can be obtained by switching the reference signals from the sine wave oscillator to the opposite multiplier. More particularly, the output of the phase shifter 9 would be fed to the first multiplier 6 and the reference output of the sine wave oscillator 8 would be fed to the second multiplier.

Alternatively, the symmetry analysis can be set to determine the proper conditions for absorption made resonance by switching the reference input to the comparator 13 to the output of a sample and hold circuit 7 which samples the output of the comparator 13 and applies same to terminal 18, such that it is used as a reference input for the comparator 13. The output of the comparator 13 comprises an error signal which is then fed to the reference sine wave oscillator 8 for changing the phase thereof to maximize the integral of the reference line. When this condition is obtained the phase of the reference sine wave oscillator 8 is properly adjusted for pure absorption mode and the switch 15 is switched to the recorder 16 and the stored time averaged and Fourier analyzed data read out through the real and imaginary channels to obtain a pure absorption mode resonance spectrum of the sample under analysis.

Referring now to FIG. 7 there is shown an alternative embodiment of a gyromagnetic resonance spectrometer 1, computer 3, and Fourier analyzer incorporating features of the present invention. The system of FIG. 7 is substantially the same as that of FIG. 1 with the exception that some of the functions performed by the analog portion of the Fourier analyzer of FIG. 1 are actually performed in the digital arithmetic unit of the computer 3. More specifically, the real and imaginary number of outputs derived from a Fourier analysis of the impulse resonance data stored in the memory, rather than being fed to the pair of DACs, are first multiplied by sine and cosine wave values of the same angle, respectively, or conversely by cosine and sine wave values of the same angle, respectively. The multiplication is controlled by the logic unit and is indicated by the external line 21 feeding from the logic to the arithmetic unit. This has the advantage over the system of FIG. 1 in that both the real and imaginary functions need not be converted from digital to analog information but may be retained in digital form and multiplied by digital sine wave values within the arithmetic unit of the computer.

The resultant real and imaginary numbers are then added in an adder within the arithmetic unit of the computer and fed to a DAC 5 which converts the complex digital resonance Fourier components to analog form. Thus, the output of the DAC 5, of FIG. 7, is substantially the same as the analog output of adder 11 in FIG. 1. The complex analog resonance signal is then analyzed for line symmetry in the manner previously described with regard to FIG. 1 to obtain an error signal which is fed to an analog-to-digital converter (ADC) 22. The digital output of the ADC 22, corresponding to the error signal, is fed back to the arithmetic unit of the computer 3 for correcting the phase of the reference sine and cosine wave values employed within the arithmetic unit for multiplying the real and imaginary portions of the Fourier analyzed time averaged components to obtain pure dispersion or pure absorption mode resonance data. When the data has been corrected for pure dispersion or absorption mode resonance, switch 15 is switched to recorder 16 for recording the pure absorption or dispersion mode resonance data.

As an alternative to the system of FIG. 7, the computer 3 need not convert the complex Fourier analyzed resonance data to analog form for analysis for line symmetry to obtain the error signal, Rather the logic unit of the computer 3 may be programmed to integrate the digital data corresponding to a Fourier analyzed reference resonance line of the spectrum to obtain either a maximum or minimum integral by performing an iterative integration of the reference resonance line data and upon each iteration deriving an error signal for correcting the phase of the reference sine and cosine wave value employed for multiplying the real and imaginary parts of the complex Fourier analyzed resonance line data. Once the proper reference for reference sine and cosine wave values have been obtained the entire Fourier analyzed resonance data stored in the memory is multiplied by the sine and cosine wave values and read out to a digital-to-analog converter 5 and thence to a recorder 16 for recording either pure absorption or pure dispersion mode resonance. The advantage of this system is that the analog-to-digital converter 22 integrator 12 and comparator 13 are not required. However, the complexity of the program utilized within the computer 3 is increased and the time required to find the correct sine and cosine values is increased, as compared to the systems of FIGS. 1 and 7.

Referring now to FIG. 8, there is shown a gyromagnetic resonance system incorporating features of the present invention. In this system, the impulse gyromagnetic resonance data is stored in analog form in a storage and adder 25, such data being stored after each impulse resonance in accordance with the output of a storage sequencer 26 which synchronizes the storage of the output resonance data, in analog form, with the pulsing of the RF transmitter within the gyromagnetic resonance spectrometer 1. The output resonance data is of an analog form as shown in FIG. 2 and the measured analog data points, corresponding to points $t_1, t_2, t_3, \ldots t_N$, are stored in analog form in N respective channels of the storage and adder 25 with the data being accumulated in each channel for a succession of resonances of the sample under analysis. The spectrometer and readout for the apparatus of FIG. 8 is substantially the same as that disclosed in U.S. Pat. No. 3,461,381 issued on Aug. 12, 1969 with the exception that the spectrometer and readout described therein is modified to include means for automatically correcting the readout to obtain either pure absorption or pure dispersion mode resonance data.

Briefly, the readout portion of the spectrometer includes a readout sequencer 27 which feeds a readout signal to the storage and adder 25 causing the resonance data stored in the storage and adder 25 to be sequentially and repetitively read out to a balanced modulator 28. The output of the storage and adder 25 comprises a repetitive time sequence of time varying output signals having the general form indicated in FIG. 2. The frequency of the Fourier components contained within the time varying output signal of the storage and adder 25 will vary in proportion to the rate at which the storage and adder 25 is read out. Typically, it is contemplated that these Fourier components may be transformed directly, but to overcome some practical problems, i.e., in order to reduce the relative frequency range of the readout phase detector, the audio components are translated to a higher frequency range. More specifically, the audio frequency components, indicated by $f_1$, are fed to the input of the balanced modulator 28 wherein they are heterodyned with a local oscillator signal $f_o$ at, for example, 100 KHz for translating the audio Fourier components in the output of the storage and adder 25 to a higher frequency range in the output of the balanced modulator 28, corresponding to one of the sidebands of the local oscillator signal $f_o$. The lower sideband signal, indicated by $(f_o-f_1)$, is selected by a suitable filter, not shown, and fed to one input of a phase sensitive detector 29. The output of a variable frequency reference oscillator 31 which may comprise frequencies from 75 to 100 Khz, to cover the expected sideband spectrum, is fed to the other input of the phase sensitive detector 29.

A sample of the variable frequency reference oscillator frequency is fed to one input of a mixer 32 wherein it is mixed with a sample of the local oscillator signal $f_o$ derived from local oscillator 33 to obtain a lower audio frequency beat signal in the frequency range of $f_1$ which is variable in accordance with variations in the frequency of the reference oscillator 31. The low audio variable frequency signal is fed to an input of a trigger pulse generator 34 which differentiates and shapes the audio frequency signal to derive a train of trigger pulses having a repetition frequency and phase corresponding to the audio frequency output of the mixer 32.

The trigger pulse output of pulse generator 34 is fed via a variable time delay 35, such as a variable delay multivibrator circuit, to the input of the readout sequencer 27 for controlling the starting time of each readout sequence of the storage and adder 25. More particularly, upon termination of each readout scan of the storage and adder 25 a new scan will not be started until the appearance of the next trigger pulse derived from the output of trigger pulse generator 34. In this manner, the starting time $t_o$ for each output signal of the storage and adder 25 is synchronized with the phase of the audio signal derived from the variable frequency reference oscillator 31.

A variable phase shifter 36 is provided between the local oscillator 33 and the balanced modulator 28 for shifting the phase of $f_o$ to adjust the phase difference between the time varying input signal $(f_o-f_1)$ to the phase sensitive detector 29 and the phase of the variable frequency reference signal derived from reference oscillator 31 such that either the pure absorption or pure dispersion mode of the Fourier resonance components in the composite resonance signal may be separately observed.

Alternatively, a phase shifter 37 may be incorporated between the phase sensitive detector 29 and the variable frequency reference oscillator 31 for varying the phase of the reference signal fed to the phase sensitive detector 29. As another alternative, a phase shifter, not shown, may be incorporated between the output of the storage and adder 25 and the input of the balanced modulator 29. However, it is preferred to place the phase shifter between the local oscillator 33 and the balanced modulator 28, as shown at 36, since in this position the phase shifter 36 always operates at a fixed frequency. Therefore, the design of the phase shifter 36 is simplified. In still another alternative, a variable time delay 38 is incorporated between the phase sensitive detector 29 and the variable frequency reference oscillator 31. In yet another alternative, a variable time delay 35 is incorporated between trigger pulse generator 34 and the readout sequencer 27 for adjusting the relative phase for pure absorption or pure dispersion mode readout.

When the frequency of the reference oscillator 31 corresponds to the frequency of one of the Fourier resonance components within the signal $(f_o-f_1)$, as fed from the balanced modulator 28 to the phase sensitive detector 29, a DC resonance output signal corresponding to that spectral line of the sample under analysis will be obtained in the output of the phase sensitive detector 29 and may be fed to the recorder 16 for recording as a function of the scan signal derived from a scanner 39 which is provided to scan the frequency of the variable frequency reference oscillator 31 through the resonance spectrum of the data as readout of the storage and adder 25.

As previously described with regard to the spectrometer systems of FIGS. 1 and 7, the spectral data stored in the storage and adder 25 is most probably not pure absorption or pure dispersion mode resonance but rather a complex resonance containing a mixture of both real and imaginary components. Since it is desired to record either pure absorption or pure dispersion mode resonance of the time averaged data, a reference Fourier resonance line is selected by causing the scanner 39 to repetitively scan through a reference line of the stored data by narrowing the scan width of the variable frequency reference oscillator 31 to a relatively narrow frequency range containing substantially only the reference line.

The resonance Fourier component, corresponding to the reference resonance line, is fed to the line symmetry analysis portion comprising integrator 12 via switch 15. The output of integrator is fed to the comparator 13, in the manner as previously described with regard to FIGS. 1 and 7, for obtaining an error signal determinative of the proper phase relation to record either pure absorption or pure dispersion mode resonance. More specifically, the error signal output of the comparator 13 is fed to any one or more of the phase shifter 37, variable time delay 35, phase shifter 36, or the variable time delay 38 as controlled by switches 41–44 to adjust such time delays or phase shifters to obtain either pure absorption or dispersion mode resonance of the reference line.

Once the proper phase relations for either pure dispersion or pure absorption mode resonance have been automatically obtained by means of the line symmetry analysis and comparator, switch 15 is switched to the recorder 16 and the time averaged resonance signal is scanned to obtain either a pure absorption or pure dispersion mode resonance spectrum of the data stored in the storage and adder 25.

In the system of FIGS. 8, the readout sequencer 27 and the scanner 39 may be set to readout and to scan at a much faster rate than that at which the original information was stored in the storage and adder 25. Provision of the local oscillator 33, for translating the time varying output signal of the storage and adder 25 to the higher frequency range, facilitates rapid scanning and sequencing of the information stored in the storage and adder 25. This results because the required bandwidth to accommodate this information is more easily obtained at the higher frequency range. However, in some applications such as electron spin resonance or nuclear quadrupole resonance, it may be desired to translate the stored frequency information to a lower frequency range in which case the scanner rate is decreased compared to the storage rate.

The automatic phase control for Fourier analysis of time averaged impulse resonance data as described above with regard to FIGS. 1, 7 and 8 is not specifically limited to analysis of gyromagnetic resonance data. More specifically, this method and apparatus is applicable to analysis of resonance spectral data obtained from nuclear magnetic resonance, electron spin resonance, nuclear quadrupole resonance, magnetic resonance of ferromagnetic materials, magnetic resonance of molecular beams, electrical resonance of molecular beams, and ion cyclotron resonance. Thus, the spectrometer need not employ a magnet, for example.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Although the phase control for readout of Fourier analyzed stored impulse resonance data has thus far been described as operating upon a single reference line of the stored data for line symmetry analysis, this is not a requirement, any number of lines of the entire spectrum may be analyzed for line symmetry to derive the error signal for changing the phase of the real and imaginary parts of the Fourier analyzed data to obtain pure absorption or pure dispersion mode resonance data. Furthermore, a number of lines at spaced intervals within the spectrum may be analyzed to derive a correction for the real and imaginary parts which are programmed to change at intervals within the spectrum.

Also, as thus far described, the Fourier analysis has always been of the stored and time averaged resonance data. This is not a requirement. More specifically in some cases, the resonance lines have a relatively large signal-to-noise ratio but the resonance conditions may be time dependent as obtained, for example, during chemical reactions. In these cases, time averaging would be eliminated and the impulse resonance data merely stored in the various channels for subsequent more leisurely Fourier analysis and read out. The read out would employ phase control, as above described, to obtain a pure absorption or pure dispersion mode resonance spectral output.

What is claimed is:

1. In a method for storing and reading out impulse resonance spectral data the steps of, storing impulse resonance data containing a plurality of simultaneous Fourier components, Fourier analyzing the stored resonance data to obtain at least one complex reference resonance line output containing a sum of both the real and imaginary parts of the resonance component, analyzing the reference complex resonance line for symmetry of the resonance line shape to obtain an output representative of the line symmetry, and changing the phase of both real and imaginary parts of the complex resonance line component by a like amount in accordance with the output of the symmetry analysis to reduce one of said parts of the complex reference resonance line component and to maximize the other part of the complex component to obtain a substantially pure absorption or pure dispersion resonance output.

2. The method of claim 1 wherein the step up analyzing for symmetry of the reference Fourier line comprises the step of iteratively integrating the reference line output and changing the phase according to the integral output to obtain either a maximum or minimum integral.

3. The method of claim 1 wherein the step of analyzing for symmetry of the reference Fourier line component comprises the step of iteratively measuring the peak amplitudes of the resonance line, comparing the measured peak amplitudes, and and changing the phase according to the compared peak amplitudes to obtain either a maximum or a minimum measure line symmetry output.

4. The method of claim 1 wherein the step of changing the phase of both the real and imaginary parts of the complex resonance component by a like amount comprises the step of multiplying the real and imaginary parts of the reference complex resonance line component by different ones of a pair of sine wave values of the same period and phase shifted 90° relative to each other and changing the phase of the pair of sine wave values by equal amounts to change the phase of the real and imaginary parts of the complex resonance component.

5. The method of claim 1 wherein the step of Fourier analyzing the stored resonance data to obtain a complex resonance line output containing a sum of both the real and imaginary parts includes the step of Fourier analyzing the stored resonance data to derive a pair of outputs representative of the real and imaginary parts, respectively, for a reference resonance line of the resonance spectrum of the sample under analysis, and adding the real and imaginary parts for the reference resonance line component to obtain a complex resonance line output containing a sum of both the real and imaginary parts.

6. The method of claim 1 including the steps of reading out a plurality of the remaining Fourier analyzed resonance lines of the spectrum from the stored resonance data, and changing the phase of the real and imaginary parts of the respective resonance lines as read out from the stored data in accordance with the output derived from the symmetry analysis of the reference resonance line to obtain substantially a pure absorption or dispersion mode resonance spectral output.

7. The method of claim 1 including the step of, accumulating such impulse resonance data desired from a plurality of successive impulse resonances to obtain a time average of the impulse resonance data, and wherein, the Fourier analysis is of the time averaged data.

8. In an apparatus for storing and reading out impulse resonance spectral data, means for storing impulse resonance data containing a plurality of simultaneous Fourier components, means for Fourier analyzing the stored spectral data to obtain a complex resonance line output containing a sum of both the real and imaginary parts of the reference resonance line component, means for analyzing the reference complex resonance line output for symmetry of the resonance line shape to obtain an output representative of the line symmetry, and means for changing the phase of both the real and imaginary parts of the complex resonance line component by a like amount in accordance with the output of the symmetry analysis to reduce one of the parts of the complex reference resonance line component and to maximize the other part of the complex resonance line component to obtain a substantially pure absorption or pure dispersion resonance output.

9. The apparatus of claim 8 including, means for reading out a plurality of the remaining Fourier analyzed resonance lines from the stored resonance data, and means for changing the phase of the real and imaginary parts of the respective resonance lines as read out from the stored data in accordance with the output derived from the symmetry analysis of the reference resonance line to obtain a substantially pure absorption or dispersion mode resonance spectrum output.

10. The apparatus of claim 8 including, means for accumulating the impulse resonance data derived from a plurality of successive impulse resonances to obtain a time average of the impulse resonance data, and wherein said means for Fourier analyzing the stored resonance data Fourier analyzes the accumulated time averaged resonance data.

11. The apparatus according to claim 8 wherein the means for Fourier analyzing the stored resonance data to obtain a complex resonance line output containing a sum of both the real and imaginary parts of the reference resonance component includes a digital computer, such digital computer having a digital output of both the real and imaginary components, digital-to-analog converter means operable upon the real and imaginary parts of the complex reference line component to obtain a pair of analog outputs corresponding to the real and imaginary parts, respectively, multiplier means for multiplying the real and imaginary analog outputs with a first sine wave value in one multiplier and a 90° phase shifted second sine wave reference value in the other multiplier to obtain a pair of outputs, adder means for adding the pair of multiplied output signals to obtain the complex reference resonance component.

12. The apparatus of claim 11 including means for generating the first and second sine wave values, and wherein said means for changing the phase of both the real and imaginary parts of the complex resonance component comprises means for automatically changing the phase of the first and second sine wave values in accordance with the output representative of the line symmetry of the reference resonance line component.

13. The apparatus of claim 8 wherein said means for analyzing the reference complex resonance line output for symmetry of the resonance line shape includes an integrator for integrating the reference resonance line output, and comparator means for comparing the output of the integrator with a reference to derive an error signal determinative of symmetry of the reference resonance line output.

14. The apparatus of claim 8 wherein said means for analyzing the reference complex resonance line output for symmetry of the resonance line shape includes means for measuring the peak amplitudes of the reference resonance line output to derive an output representative of the symmetry of the resonance line shape.

* * * * *